(No Model.)
W. M. LOGAN.
BRICK MACHINE.
No. 323,818. Patented Aug. 4, 1885.
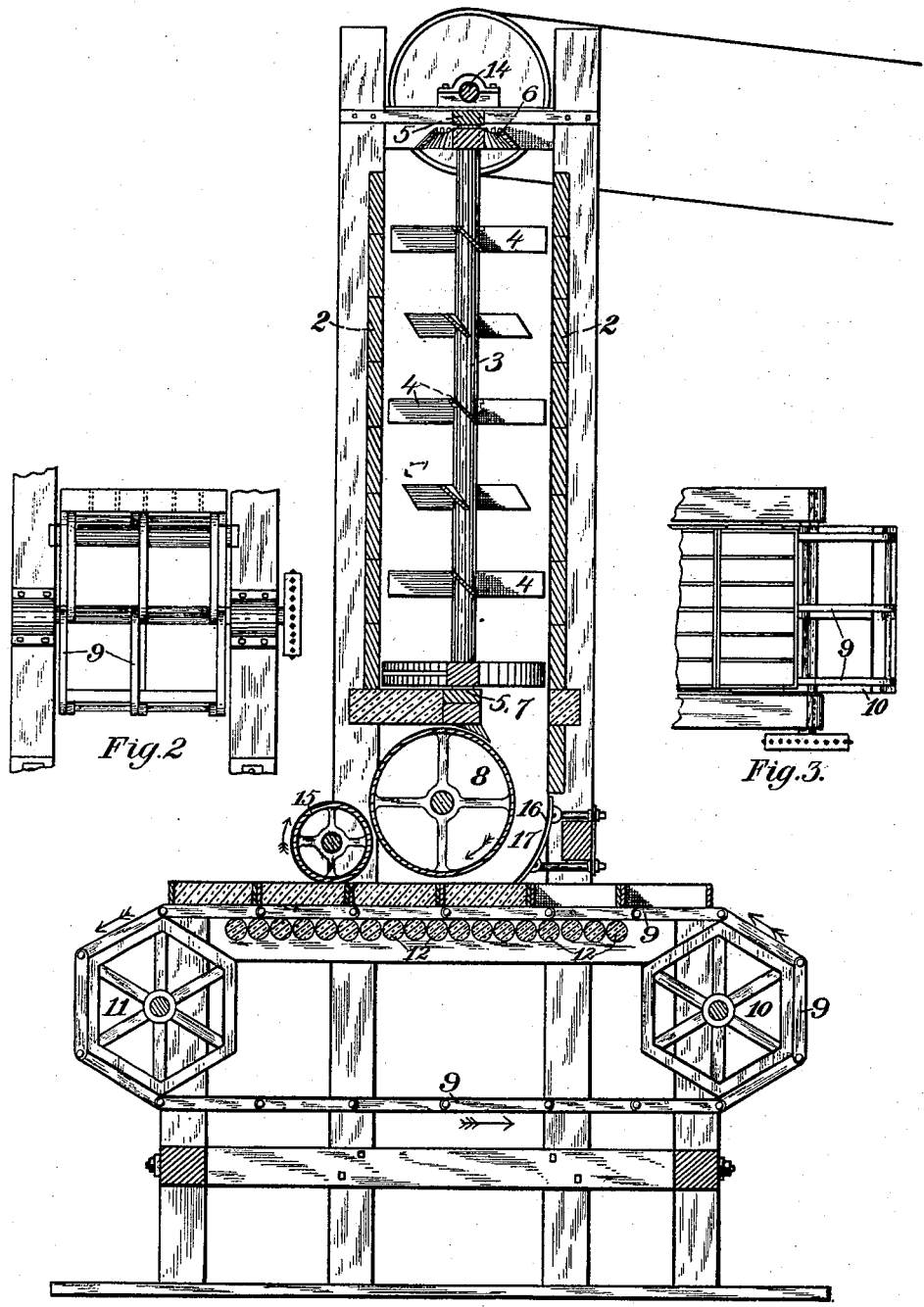
Witnesses
Inventor:
William M. Logan
by his Attorneys
Bakewell & Kerr

UNITED STATES PATENT OFFICE.

WILLIAM M. LOGAN, OF ETNA, PENNSYLVANIA.

BRICK-MACHINE.

SPECIFICATION forming part of Letters Patent No. 323,818, dated August 4, 1885.

Application filed May 18, 1885. (No model.)

*To all whom it may concern:*

Be it known that I, WILLIAM M. LOGAN, a resident of Etna borough, in the county of Allegheny and State of Pennsylvania, have invented a new and useful Improvement in Brick-Machines; and I do hereby declare the following to be a full, clear, and exact description thereof, reference being had to the accompanying drawings, forming part of this specification, in which—

Figure 1 is a side elevation of my improved machine, shown partly in vertical section. Fig. 2 is an end view of part of the same. Fig. 3 is a plan view of the brick-molds and the mechanism for carrying them through the machine.

Like letters of reference indicate like parts in each.

My machine is designed for the double purpose of tempering clay and forming it into bricks. The tempering mechanism of the machine, or what is commonly known as the "pug-mill," consists of a vertical box, 2, longitudinally mounted, within which is a shaft, 3, provided at suitable intervals with radial blades 4, whose surfaces are set at an acute angle to the shaft and helically relatively to each other. The shaft 3 has suitable bearings, 5, at the bottom and top of the box 2, and is driven by a spur-wheel, 6, which meshes into a beveled pinion on the shaft. The box 2 is provided at the bottom with an opening, 7, through which the clay is discharged from the pug-mill onto the side of a pressing-roller, 8. Running horizontally beneath the roller is an endless belt, 9, mounted on suitable belt-wheels, 10 and 11, and supported at its upper side by a series of idler-wheels, 12. The belt is preferably made of a number of rigid frames or sections hinged together on transverse axes, as shown in Fig. 2. The purpose of the belt is to carry a series of removable molds from one side of the machine to the other and under the roller 8 and discharge 7 of the pug-mill. These molds consist of rectangular boxes made with bottoms and divided into adjacent compartments, as shown in Fig. 3, each compartment being made of the size of a single brick. The mold-boxes are set loosely upon the belt, so that they can be easily lifted therefrom. The roller 8 and belt-wheels 10 and 11 are driven by belts from the shaft 14, or otherwise, as desired. Just in front of the roller 8 is a second roller, 15, whose axis is transverse to the course of the belt, and whose radius is such that it will be in contact with, or nearly in contact with, the top of the molds 13, when the latter are placed on the belt under it.

Thus constructed, the operation of the machine is as follows: Clay is put into the top of the box or pug-mill shaft 2, and by rotation of the blades 4 is thoroughly mixed and tempered. The inclination of the blades is such as to force the clay downward in the mill and out of the opening 7 into the passage or throat 17 beside the roller 8. The revolution of the latter in the direction of the arrow carries the tempered clay downward and presses it upon and into the molds, which are situate thereunder. As an auxiliary to this part of my machine I arrange a curved guide-plate, 16, opposite the face of the roller, for guiding the tempered clay into the molds. The roller 8 is also preferably further inclosed by a box, which prevents escape and scattering of the clay. The endless belt 9 revolves continuously and carries its molds in succession under the clay-discharge passage 17. Each one as it passes this point is filled with clay, which is packed into the molds by pressure of the roller 8. Further advance of the belt will carry a given set of molds under the roller 15, whose circumference being on a level with the top thereof will press and pack the clay down very tightly and will remove any surplus clay which may have passed the larger roller 8. After the molds have passed the roller 15 the several sets are removed by a workman standing at the front of the endless belt. They are substituted by empty molds placed at the other end of the belt next the wheel 10.

The advantages of my machine are its simplicity and ease of operation.

The vertical situation of the pug-mill box 2 facilitates the discharge of the clay upon the molds, while the rotation of the blades 4 is amply sufficient to temper the clay to make a fine quality of brick. The rapidity with which the clay is discharged upon the molds may be regulated by varying the size of the discharge-passage 17.

Any other suitable carriage may be substituted for the belt 9, though I regard the latter as the most useful device.

I am aware that it is not new to make bricks by carrying molds first under the orifice of a pug-mill, and then beneath the periphery of a pressing-roller; but in none of the machines of this class known prior to my invention have the molds themselves been removable from the belt or carriage, and the bricks must therefore be removed by auxiliary mechanism, which is of serious detriment in spoiling their proper shape. In my machine, as before described, the molds being made removable from their carriage, and open on the top alone, the bricks are formed with certainty of shape, and after being pressed may be lifted out in the molds and removed in the usual way without danger. I therefore desire to limit the scope of my invention strictly to its definition as contained in the following claim.

What I claim as my invention, and desire to secure by Letters Patent, is—

In a brick-machine, the combination of a tempering-mill, a pressing-roller, an endless belt, and a series of molds made in the form of polygonal boxes open at the top but closed at the sides and bottom, said belt being movable to carry molds removably placed thereon under the discharge-orifice of the tempering-mill and under the periphery of the pressing-roller, substantially as and for the purposes described.

In testimony whereof I have hereunto set my hand this 12th day of May, A. D. 1885.

WILLIAM M. LOGAN.

Witnesses:
F. W. BAKEWELL,
JAMES H. PORTE.